(12) United States Patent  
Perisic

(10) Patent No.: US 7,181,136 B2  
(45) Date of Patent: Feb. 20, 2007

(54) APPARATUS FOR STEREOSCOPIC PHOTOGRAPHY

(76) Inventor: Zoran Perisic, Gwynfenton, Whitewell, St. Teath, Cornwall PL30 3LH (GB)

( * ) Notice: Subject to any disclaimer, the term of this patent is extended or adjusted under 35 U.S.C. 154(b) by 114 days.

(21) Appl. No.: 10/501,242

(22) PCT Filed: Jan. 14, 2003

(86) PCT No.: PCT/GB03/00093

§ 371 (c)(1), (2), (4) Date: Jul. 12, 2004

(87) PCT Pub. No.: WO03/063511

PCT Pub. Date: Jul. 31, 2003

(65) Prior Publication Data

US 2005/0030478 A1    Feb. 10, 2005

(30) Foreign Application Priority Data

Jan. 17, 2002  (GB) ................................ 0201047.8

(51) Int. Cl.
*G03G 35/18* (2006.01)
*G02B 27/22* (2006.01)

(52) U.S. Cl. ..................... 396/331; 352/65; 359/462

(58) Field of Classification Search ................ 396/331, 396/333, 430, 322–324; 353/7, 8; 359/462, 359/464; 352/65
See application file for complete search history.

(56) References Cited

U.S. PATENT DOCUMENTS

| | | | | |
|---|---|---|---|---|
| 2,313,562 A * | 3/1943 | Mainardi et al. | ........... | 359/472 |
| 2,403,733 A * | 7/1946 | Mainardi et al. | ........... | 396/331 |
| 2,413,996 A * | 1/1947 | Ramsdell | ..................... | 396/331 |
| 3,815,970 A * | 6/1974 | Murphy | ..................... | 359/462 |
| 6,721,500 B2 * | 4/2004 | Perisic | ..................... | 396/331 |

* cited by examiner

*Primary Examiner*—W. B. Perkey
*Assistant Examiner*—Rishi Suthar
(74) *Attorney, Agent, or Firm*—Melvin I. Stoltz

(57) ABSTRACT

An apparatus for providing left and right eye images along the axis of a single camera lens (7), the apparatus comprising optical means arranged to provide said left and right eye images (22, 20) as a pair of head-to-head or toe-to-toe images, i.e. with the two images (20, 22) separated by a center line and with either the tops of the two images (20, 22) or the bottoms of the two images (20, 22) adjacent the center line, so that the left and right eye images (22, 20) can be simultaneously recorded onto a single frame of a photographic film or other recording medium.

1 Claim, 10 Drawing Sheets

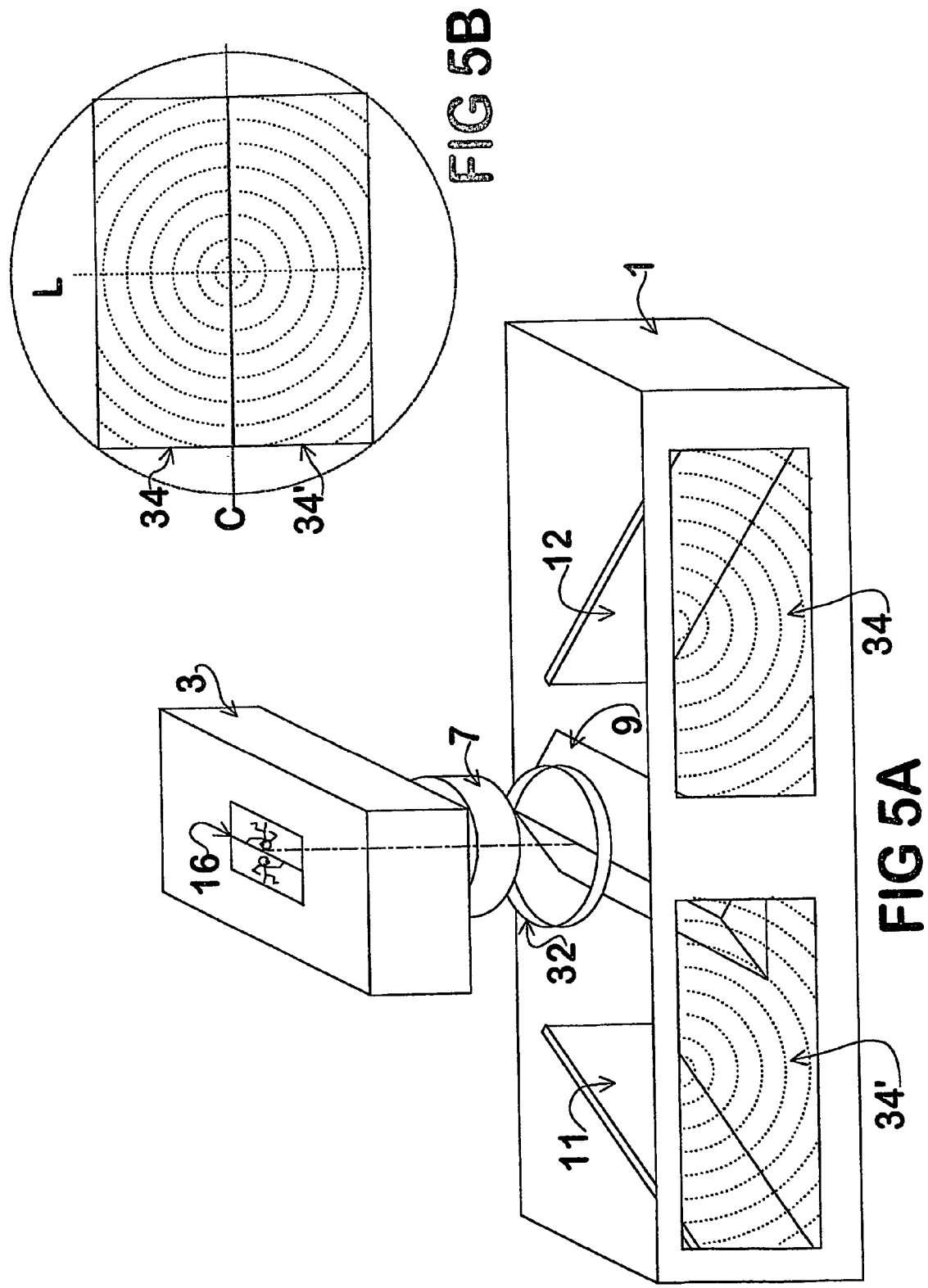

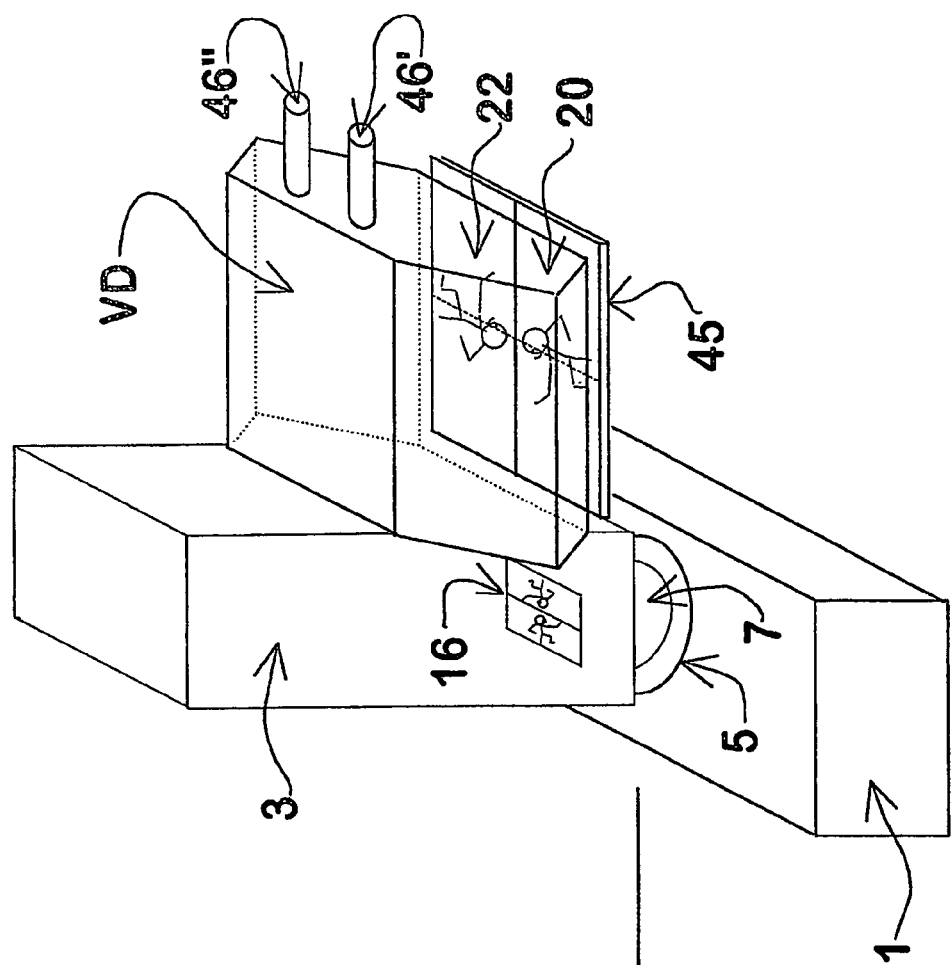
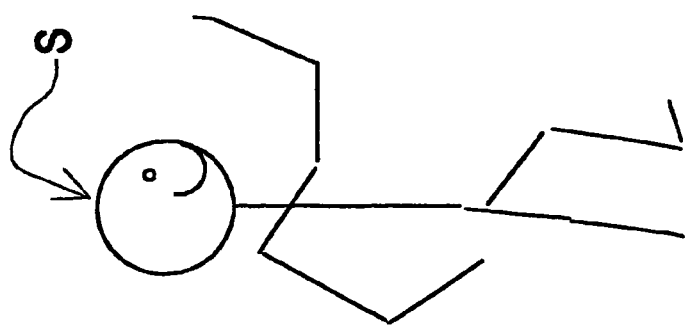
FIG 9A

APPARATUS FOR STEREOSCOPIC PHOTOGRAPHY

FIELD OF THE INVENTION

This invention relates to apparatus for providing and/or recording left and right eye images for three-dimensional photography, cinematography and/or videography and the means of viewing those images to produce a full stereoscopic effect.

BACKGROUND OF THE INVENTION

Three-dimensional photography is achieved by recording left and right eye views of a scene as two separate images. The left and right images are projected simultaneously onto a screen, typically one coated with a metallic surface. The separation between the two images is accomplished by means of polarizing filters placed in the projection beams of the left and right images with the polarizing axes set at 90 to each other and therefore cancelling each other. To ensure that each eye sees only the corresponding image the stereoscopic scene is viewed through glasses with polarizing filters whose polarizing axes are set at 90° to each other. The resultant stereoscopic image can be viewed in full color.

The stereoscopic images can be recorded by various means, for example, using two cameras set side by side (as described in U.S. Pat. No. 5,835,133) or a split lens system designed to record a stereoscopic pair of images on the same frame side by side or one image above the other. The latter scheme is known as an 'over-under' approach and an example thereof is described in U.S. Pat. No. 4,436,369. The pair of images may be arranged side by side, but with one image turned through 180° relative to the other image, as described in U.S. Pat. Nos. 5,357,369 and 5,727,239.

An alternative technique has been developed for cinematography whereby the discrete left and right eye images are recorded separately and sequentially on the image-recording medium, i.e. on alternate frames of a photographic film at double the normal frame rate. Such an arrangement is shown in U.S. Pat. No. 4,676,298. The images can be viewed either by projecting the images sequentially at double the normal frame rate or by simultaneously projecting both the left and right eye images through an optical arrangement that superimposes both images onto the screen. Crossed polarizing filters are placed in the projected beams of the appropriate images. The images are viewed through glasses with polarizing filters whose polarization axes are at 90° to one another corresponding to the polarization axes of the projected images.

However, in the case of the "over-under" method, where a single projection lens and additional optical arrangements are used to project both images the projection arrangement has a detrimental effect that the optical distortions introduced by the optical elements, mainly spherical aberrations tend to be exaggerated when the two images are superimposed onto each other for viewing. A perfect match between the two images is not possible on projection because each image is affected differently by the spherical aberrations of the projection lens since both images are part of the same image circle, i.e. the top corners of the upper image really match the bottom corners of the lower image instead of the corresponding corners.

It would therefore be advantageous to provide apparatus for recording and viewing three-dimensional images that has the advantages of the present known systems, but that mitigates the known disadvantages of these systems. For such an apparatus to be able to record and reproduce a stereoscopic image with a realistic depth perception, it would need to have all three of the following key elements:

a) a wide horizontal angle of view, of approximately 45° or 60°, b) variable convergence, emulating the functions of human eyes, and c) an inter-ocular distance corresponding to that of human eyes, the average distance in adults being 65 mm.

SUMMARY OF THE INVENTION

According to a first aspect of the present invention there is provided an apparatus for providing left and right eye images with a horizontal angle of view of at least approximately 45° along the axis of a single camera lens, the apparatus comprising optical means arranged to provide said left and right eye images as a pair of head-to-head or toe-to-toe images, i.e. with the two images separated by a center line and with either the tops of the two images or the bottoms of the two images adjacent the center line, so that the left and right eye images can be simultaneously recorded onto a single frame of a photographic film or other recording medium.

The optical means preferably comprises two reflecting elements for each of the two images respectively, the reflecting elements being positioned in front of a camera lens. The reflecting elements conveniently comprise first and second reflecting elements arranged to receive the left and right eye images respectively and third and fourth reflecting elements that are arranged to receive said left and right eye images from said first and second reflecting elements and to provide said left and right eye images along the axis of a camera lens, e. g. with a focal length of 45 mm. on a 35 mm. stills format or a focal length of 28 mm on a 35 mm. cine format, resulting in a horizontal angle of view of approx 45°.

The first and second reflecting elements comprise plane mirrors and the third and fourth reflecting elements preferably comprise two faces of a triangular prism, the plane mirrors each being arranged to reflect the light rays of the left and right eye images respectively onto opposing faces of the triangular prism, the triangular prism being arranged to redirect said incident light rays towards the camera lens whose axis is at 90° to the direction of view of the first and second reflecting elements.

The apparatus preferably includes variable convergence adjustment means, so that the convergence of the optical axes of the left and right eye images can be varied in a manner substantially consistent with the convergence function of natural eyes. Preferably, the convergence adjustment means comprises a mechanism for varying the angle at which the first and second reflecting elements are set in relation to the direction of view and consequently to the axes of the third and fourth reflecting elements. The convergence adjustment means may comprise a rotary adjustment mechanism. The first and second reflecting elements are preferably interconnected by a mechanical linkage, such that the first and second reflecting elements are constrained to being arranged at the same angle of convergence relative to the direction of view.

The apparatus preferably includes variable inter-ocular adjustment means arranged to adjust the distance between the image axes of the said first and second reflecting elements such that they are separated by a distance substantially consistent with the average inter-ocular distance of human eyes, i.e. 65 mm. being the average in adults.

The apparatus preferably also includes an optical element arranged to extend the horizontal angle of view of the apparatus to approximately 60°. Preferably, the optical element comprises a pair of optically identical first lenses or lens groups of negative optical power, each first lens or lens group being located along the respective axes of the left and right eye images and in front of said first and second reflecting elements. The optical element preferably also comprises a second lens or lens group of positive power, located along the axis between the camera lens and third and fourth reflecting elements such that both left and right eye images are incident on the second lens or lens group. A suitable spacer, such as an extension tube placed between the camera body and the camera lens, may be used in place of the second lens or lens group.

The first lens group preferably comprises a pair of individual halves of an optical element, each half optical element being placed in front of said first and second reflecting elements in correct alignment with the optical axis of the camera lens.

Both halves of the first optical element are preferably coupled to the convergence adjustment means, so that operation of the convergence adjustment means causes adjustment of the two halves of the first optical element.

As mentioned above, the first and second reflecting elements may comprise plane mirrors and the third and fourth reflecting elements may comprise a triangular prism with reflecting sides, the plane mirrors each being arranged to reflect the light rays of the left and right eye images respectively onto opposing faces of the triangular prism, and the triangular prism being arranged to redirect said incident light rays towards the camera lens.

The second lens or lens group of positive power may be replaced or augmented by parabolic mirrors placed in the position (and in place) of the reflecting prism surfaces.

The first and second lenses or lens groups may be of spherical construction. Additionally or alternatively, the first and second lenses or lens groups may be replaced or augmented by anamorphic lenses.

The optical apparatus is preferably arranged so that it can be coupled to the front of a standard lens of a camera or other image-recording device.

According to a second aspect of the present invention there is provided apparatus for use in viewing a three-dimensional image, the apparatus comprising optical means arranged to simultaneously receive left and right eye images in the format of a pair of head-to-head or toe-to-toe images and to provide a superimposed projected image comprising the left and right eye images to a viewing screen.

The optical means preferably comprises first and second reflecting elements arranged to respectively project the left and right eye images, the first and second reflecting elements being arranged along an axis extending substantially at right angles to the axis of the projection lens.

An inter-ocular adjustment means is preferably provided to adjust the separation of the image axis of the first and second optical elements. For standard projection purposes, the inter-ocular distance between the axes of the left and right images does not have to be the inter-ocular distance of human eyes.

The apparatus may also include means for adjusting the angle of incidence of said first and second reflecting elements to the central axes of the respective left and right eye images, so that the convergence of said left and right eye images is adjustable.

The optical apparatus is preferably arranged so that it can be coupled to the front of a projection lens.

The apparatus may further include polarizing means for polarizing the left and right eye images, whereby the superimposed composite image may be viewed using corresponding polarizing filters to perceive a three-dimensional image when projected onto a screen with a suitable metallic surface.

The apparatus may further include a viewing device comprising a viewing box into which said composite image is projected, the viewing box having one or more reflective surfaces that are arranged to project the left and right images onto a side wall of said viewing box, the viewing box further comprising a viewing window through which said projected image may be viewed.

An optical element may be provided on the side wall of the viewing box on which the left and right images are projected, the optical element being arranged to reflect incident light rays back along their axes so that a three-dimensional image may be viewed with the naked eyes by a single viewer without the use of polarizing elements. Preferably, the optical element may comprise front-projection material. The optical element or front-projection screen may be placed at a distance, i.e. remote from the viewing box.

An identical apparatus attached to the front of a camera lens and placed in the position of the viewer in correct alignment along the corresponding axes of the projection apparatus will be able to record the left and the right eye images reflected from the auto-collimating front-projection screen simultaneously. Moreover, a subject placed in front of the front projection screen within the field of view of the apparatus and lit appropriately will be recorded as a three-dimensional composite image, i.e. it will be seen by the camera as being inside the projected image. This can be particularly effective when the stereoscopic projected image has some foreground elements and the "subject" is placed at middle distance. Front-projection is an established technique for creating visual effects composites in conventional monocular image recording.

The same viewing box can be used to view three-dimensional images recorded by means of the first aspect of the present invention and reproduced in the from of photographs, television or computer images. The recorded image in the head-to-head or toe-to-toe configuration may be transferred by means of an arrangement of lenses acting as a relay to an apparatus as described above and projected as a composite image onto the screen. A three-dimensional video image can also be viewed in real time when a device as described above is attached to the video camera lens.

The viewing box can also be used for direct three-dimensional viewing (a three-dimensional periscope) utilizing the relays system with an apparatus attached at each end of the viewing box, the first apparatus acting as a taking system that creates the left and right images and the second apparatus acting as a projection system that superimposes the two images onto the viewing screen inside the box. An image intensifier or similar device may also be placed in the image path.

The apparatus may further include a second viewing device that is attached to the flip-out screen of a video camera enabling the viewer to see a three-dimensional image during the recording or playback of a pair of stereoscopic images when the apparatus described above is attached to the front of the video camera. The same viewing device may also be used independently of the video camera and in conjunction with a flat screen TV or computer monitor. When the apparatus described above is used in conjunction with a cine camera, an image from a video assist camera, which is typically attached to the viewfinder, can be viewed by means of the second viewing device at the time of the recording and also for playback.

Advantages of the apparatus of the present invention include the single camera system, variable convergence control mimicking the movements of the human eyes in the horizontal plane, wide horizontal angle of view (either 45° or 60°) at the correct inter-ocular distance corresponding to that of the average human eyes.

Another advantage of the apparatus of the present invention is that the camera lens does not compound the spherical aberrations of the recorded images, because the left and right eye images are recorded as head-to-head or toe-to-toe images and, as such, are affected equally by the spherical aberrations. Thus, when the two images are superimposed for viewing they effectively cancel one another. The quality of the perceived three-dimensional image is therefore improved.

BRIEF DESCRIPTION OF THE DRAWINGS

FIG. 5A schematically illustrates the location of first and second a focal adjustment lenses according to an embodiment of the present invention;

FIG. 5B schematically illustrates the optical configuration of the first a focal lenses of the arrangement shown in FIG. 5A;

FIG. 9A schematically illustrates the apparatus shown in FIG. 1 with an attached video camera and the location of a viewing device over the flip-out screen;

DESCRIPTION OF THE PREFERRED EMBODIMENTS

Figure 1:
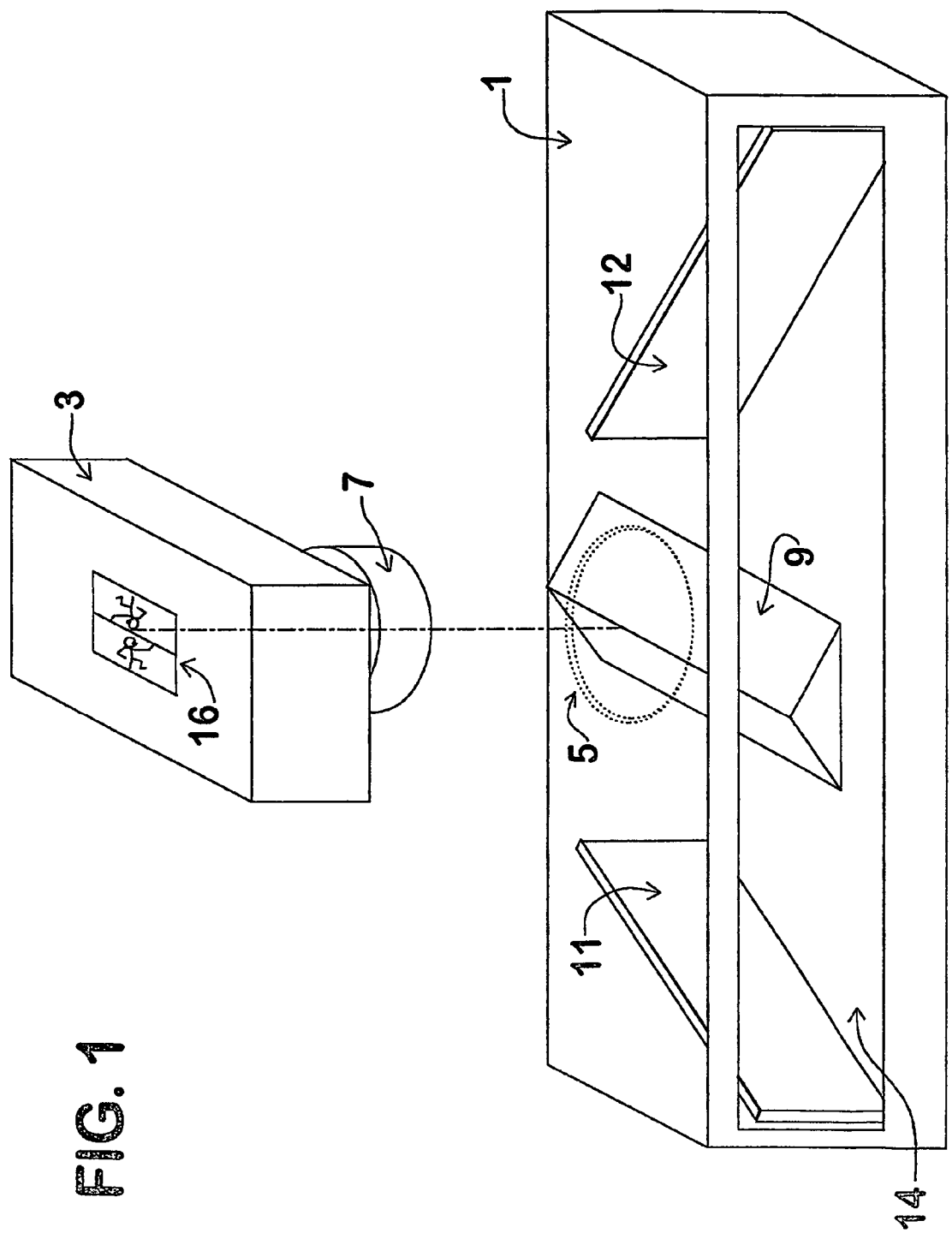
FIG. 1 schematically illustrates apparatus according to an embodiment of the present invention.

The apparatus 1 shown in FIG. 1 is arranged to be coupled to a conventional camera 3 by means of a coupling ring 5. The camera 3 may be a conventional 35 mm. camera or the like, or may equally be a video or cinematographic camera. The camera 3 has a lens 7 to which the coupling ring 5 of the apparatus 1 is attached, for example, utilising the screw thread provided on conventional camera lenses. Located along the axis of the camera lens 7 and coupling ring 5 is a triangular prism 9 arranged so that two of the prism faces are directed towards the camera lens 7. The prism faces are coated and act as front-surface plane mirrors. Alternatively small front-surface mirrors can be attached to the faces of the prism.

Located on the same plane as the triangular prism 9, and therefore at substantially 90° to the camera axis, are two plane mirrors 11 and 12. An aperture 14 is provided in the front face of the apparatus 1 through which light rays are received. The plane mirrors 11 and 12 are arranged at an angle to the triangular prism 9 such that light rays received through the aperture 14 are reflected onto respective faces of the triangular prism 9. The light rays received from a scene by the plane mirror 12 constitute a left eye image, whereas the light rays received by the plane mirror 11 constitute a right eye image.

The prism 9 redirects the left and right eye images to the camera lens 7 such that they are recorded on the focal plane 16 of the lens 7 (see FIG. 3) at which an image recording medium is located. Both left and right eye views are recorded on a standard frame divided into two along the horizontal line. The camera 3 is positioned so that its lens axis is at 90° to the direction of view of the apparatus. Thus, when the camera lens 7 is pointing down, the left and right eye images are recorded in a head-to-head configuration and in toe-to-toe configuration when the camera lens 7 is pointing up.

Figure 2A:
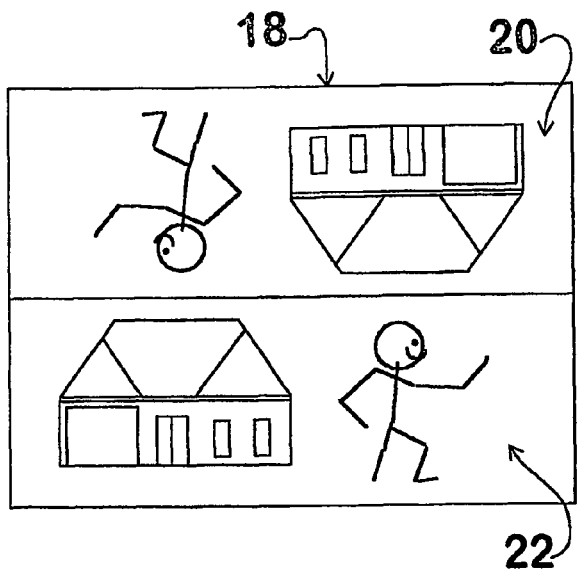
FIG. 2A schematically illustrates a single photographic frame on which left and right eye images have been recorded in a horizontal format and a head-to-head configuration by apparatus as shown in FIG. 1.
Figure 2B:
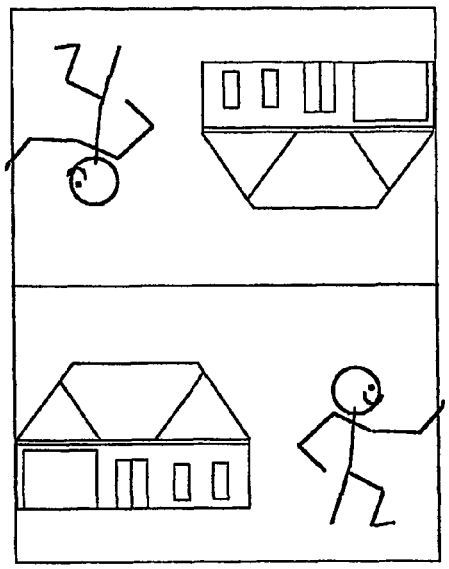
FIG. 2B schematically illustrates a single photographic frame on which left and right eye images have been recorded in a vertical format and a head-to-head configuration by apparatus as shown in FIG. 1.
Figure 2C:
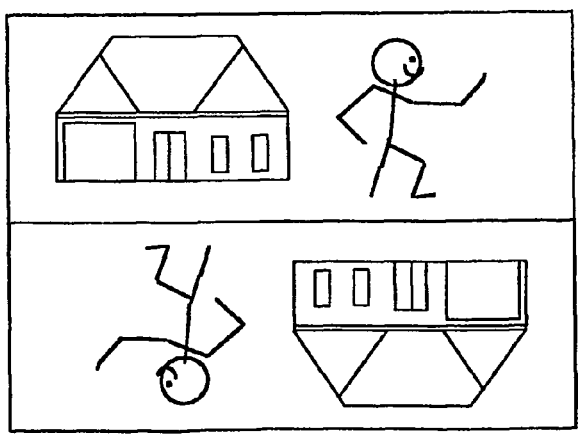
FIG. 2C schematically illustrates a single photographic frame on which left and right eye images have been recorded in a horizontal format and a toe-to-toe configuration by apparatus as shown in FIG. 1.
Figure 2D:
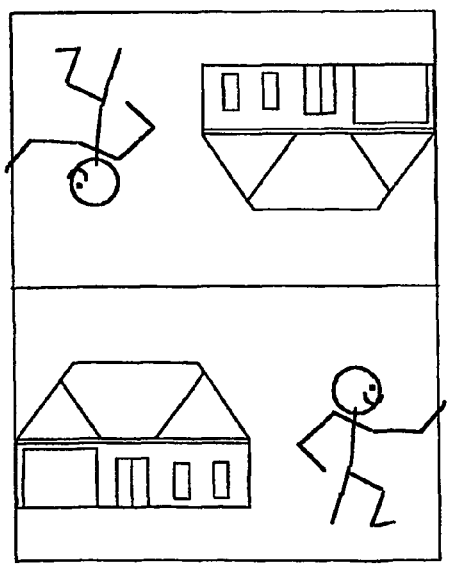
FIG. 2D schematically illustrates a single photographic frame on which left and right eye images have been recorded in a vertical format and a toe-to-toe configuration by apparatus as shown in FIG. 1.

FIGS. 2A, 2B, 2C and 2D schematically illustrates the format in which the left and right eye images are recorded. FIG. 2A illustrates a complete photographic frame 18. On the lower half of the frame 18 is recorded the right eye image 20 of a scene and on the upper half of the frame 18 is recorded the left eye image 22 of the same scene. It can be seen that the left and right eye images are recorded as head-to-head images, by which is meant that the elements of one image appear to be upside down with respect to corresponding elements of the other image. However, it will be noted that the left and right images are not simply recorded as mirror images along a line of symmetry intersecting the frame 18, but are laterally reversed with respect to one another. The standard frame can be split either along the horizontal center line as illustrated in FIG. 2A or with the camera 3 rotated 90°, the frame can be split along the vertical center line as in FIG. 2B. The horizontal splitting arrangement has the advantage of a wider horizontal angle of view. In both cases, the images are rectangular in shape with the horizontal axis longer than the vertical one. FIGS. 2C and 2D illustrate the toe-to-toe configuration.

Figure 3:
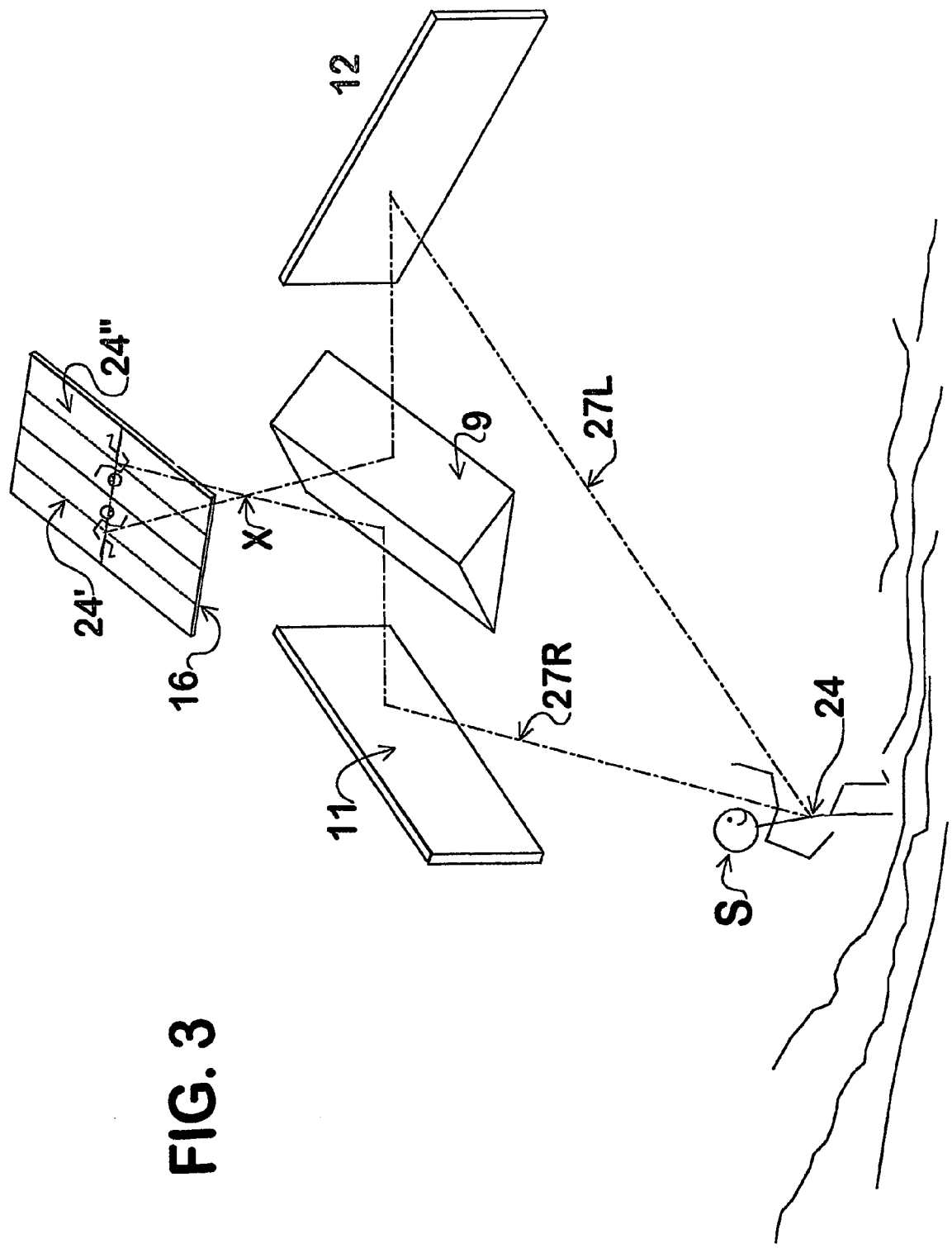
FIG. 3 schematically illustrates the optical paths of light rays through the apparatus shown in FIG. 1.

FIG. 3 schematically illustrates the optical path of light rays through the apparatus shown in FIG. 1. The scene 24 includes a subject S on which the apparatus is converged. To aid clarity, only the center light rays of the left and right eye views 27L and 27R are illustrated. By following the illustrated light rays 27L and 27R, it will be seen that the reflecting surfaces of the prism 9 cause the separate left and right views to be re-directed to the camera lens located at X. Images of the left and right eye view 24' and 24" are formed on the focal plane 16.

Each plane mirror 11, 12 is mounted on an adjustment mechanism (not shown) such that some degree of rotational adjustment about the vertical axes of the mirrors 11, 12 is possible. This allows the angle that the mirrors 11, 12 subtend to the faces of the prism 9 to be adjusted. This also adjusts the angle of convergence of the optical axes 27L and 27R. The adjustment mechanisms of the two mirrors 11 and 12 are preferably coupled to one another such that a single adjustment control can be utilised to adjust the positions of both mirrors 11 and 12, and both mirrors 11, 12 are adjusted in synchronism.

One method of providing the adjustment facility is to mount the mirrors 11 and 12 onto two meshing gears (not shown) so that the reflecting surface of each mirror 11, 12 runs through the pivot point of the gear. As one gear is rotated in one direction it will automatically rotate the other gear in the opposite direction. However, it will be appreciated that other adjustment mechanisms may also be used.

It has been found that the angle of convergence is particularly important in order to emulate the eyes of an observer standing at the same position as the camera 3 at the time of image capture.

The distance between the image axes of the plane mirrors 11 and 12 is also preferably adjustable. This distance is known as the inter-ocular distance and it has been found that, for a realistic three-dimensional impression to be gained, the inter-ocular distance must be substantially the same as that of the average distance between human eyes. This distance is generally between 60 and 75 mm. and it is therefore this distance and range of adjustment that is preferably provided in the apparatus 1.

Figure 4A:
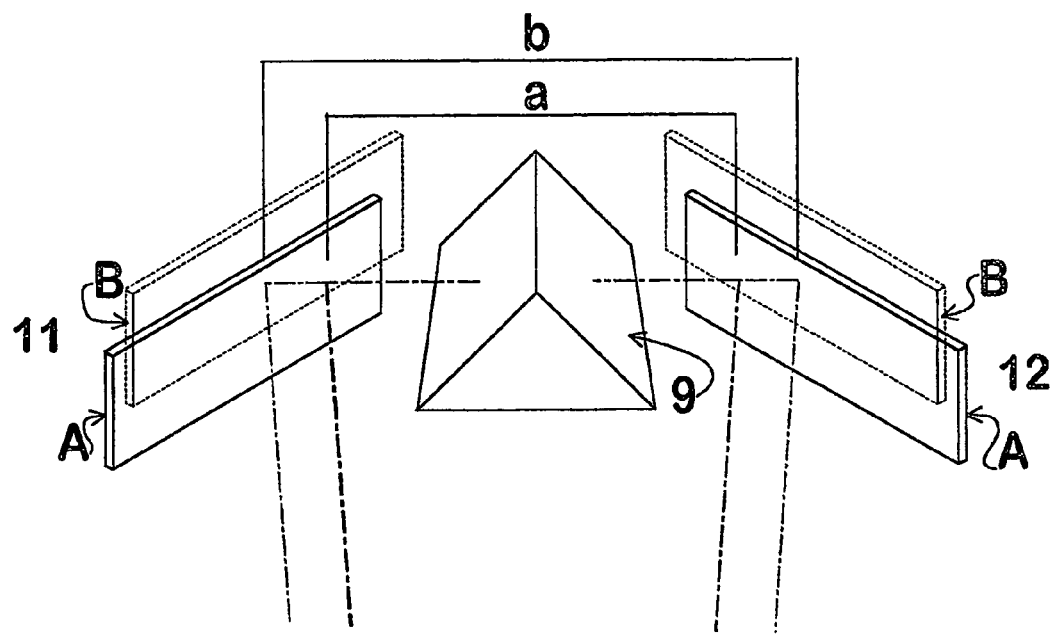
FIG. 4A illustrates the method of adjustment of the inter-ocular distance for the apparatus shown in FIG. 1.

Referring next to FIG. 4A, when the plane mirrors 11 and 12 are moved together along their respective axis from position A to position B, preferably in alignment with the longitudinal axis of the prism 9, the image center axes intercepted by the surfaces of the mirrors 11 and 12 are at a different point, resulting in the intra-ocular distance, represented by arrow b, at position B being greater than that at position A, represented by arrow a.

A horizontal angle of view of approx 45° can be covered by a camera lens of 45 mm. focal length on full 35 mm. stills format and by a camera lens of 28 mm. focal length on a 35 mm. cine format.

Figure 4B:
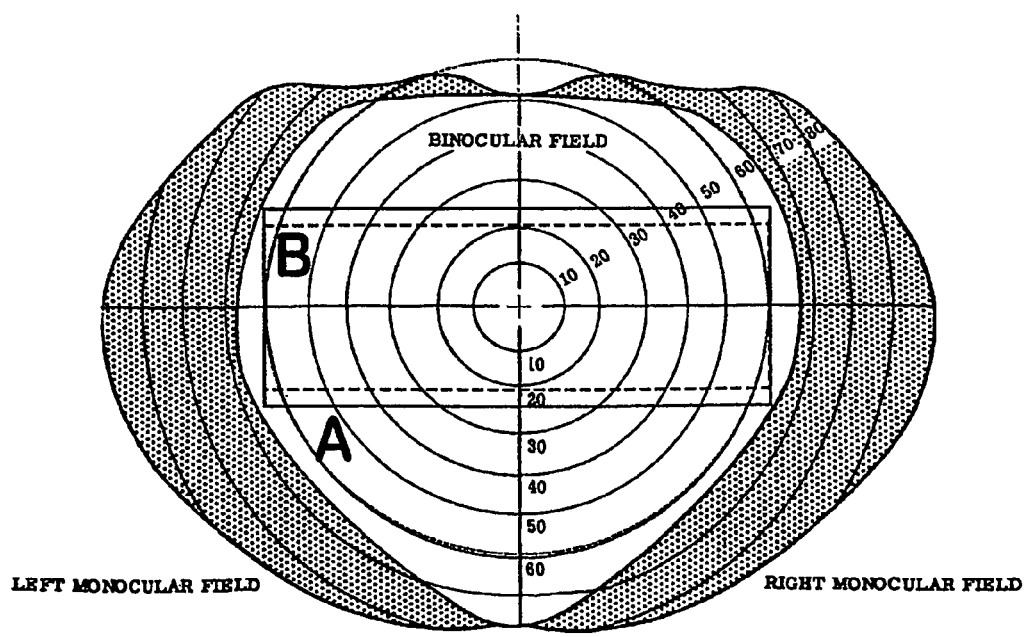
FIG. 4B illustrates the coincidence of a 60° horizontal angle of view with the binocular field.

FIG. 4B shows the binocular field—the overlap area of the left and right eye monocular fields. Concentric circles represent the angles of view. It can be seen that the 60° circle corresponds best to the horizontal coverage of a rectangular image frame with aspect ratios of 2.5:1 (A) and 3:1 (B). Therefore, an ideal stereoscopic lens imaging apparatus should have a horizontal angle of view of approximately 60° in order to substantially match this natural horizontal field of vision.

In the arrangement shown in FIG. 5A, a horizontal angle of view of approximately 60° is achieved by placing a lens or lens group 32 of positive power in the path of the light rays between the prism 9 and the lens 7 of the camera 3 and placing a further lens or lens group 34 and 34' of negative power in the path of the light rays forming the left and right eye images prior to the light rays being incident on the plane mirrors 11 and 12. Because the light rays from the left and right eye images respectively only form one half of the total image on the focal plane 16, the lens groups placed before each of the plane mirrors 11 and 12 may be of the split-lens type to best match the optical characteristics of the primary imaging lens 7 on the camera 3. This is illustrated schematically in FIG. 5B where the lens L is cut in half along the center line C, and separate half moon lenses 34 and 34' are ground to the required rectangular shape and located in front of the left and right plane mirrors 11, 12 respectively. The spherical characteristics of the lens L are indicated by concentric circles in FIG. 5B.

The apparatus required to view the recorded images so as to experience the three-dimensional impression is dependent upon the recording medium used to record the initial left and right eye images. If the left and right eye images are recorded on conventional photographic transparency film or as a moving image by a cine camera, then the three-dimensional image may be viewed by attaching the apparatus of FIG. 1 to the lens of a conventional transparency projector, placing polarizing filters over the left and right halves of the aperture 14 of the apparatus 1, so as to cross-polarize the left and right eye images, projecting the polarized images onto a metallic screen and viewing the projected image using correspondingly polarized filters or glasses. The use of the polarizing filters and polarizing glasses ensures that the corresponding eye of an observer only receives the corresponding projected left or right eye image. Ideally, the projection version of the apparatus 1 would be modified to suit the particular projection lens.

Figure 6:
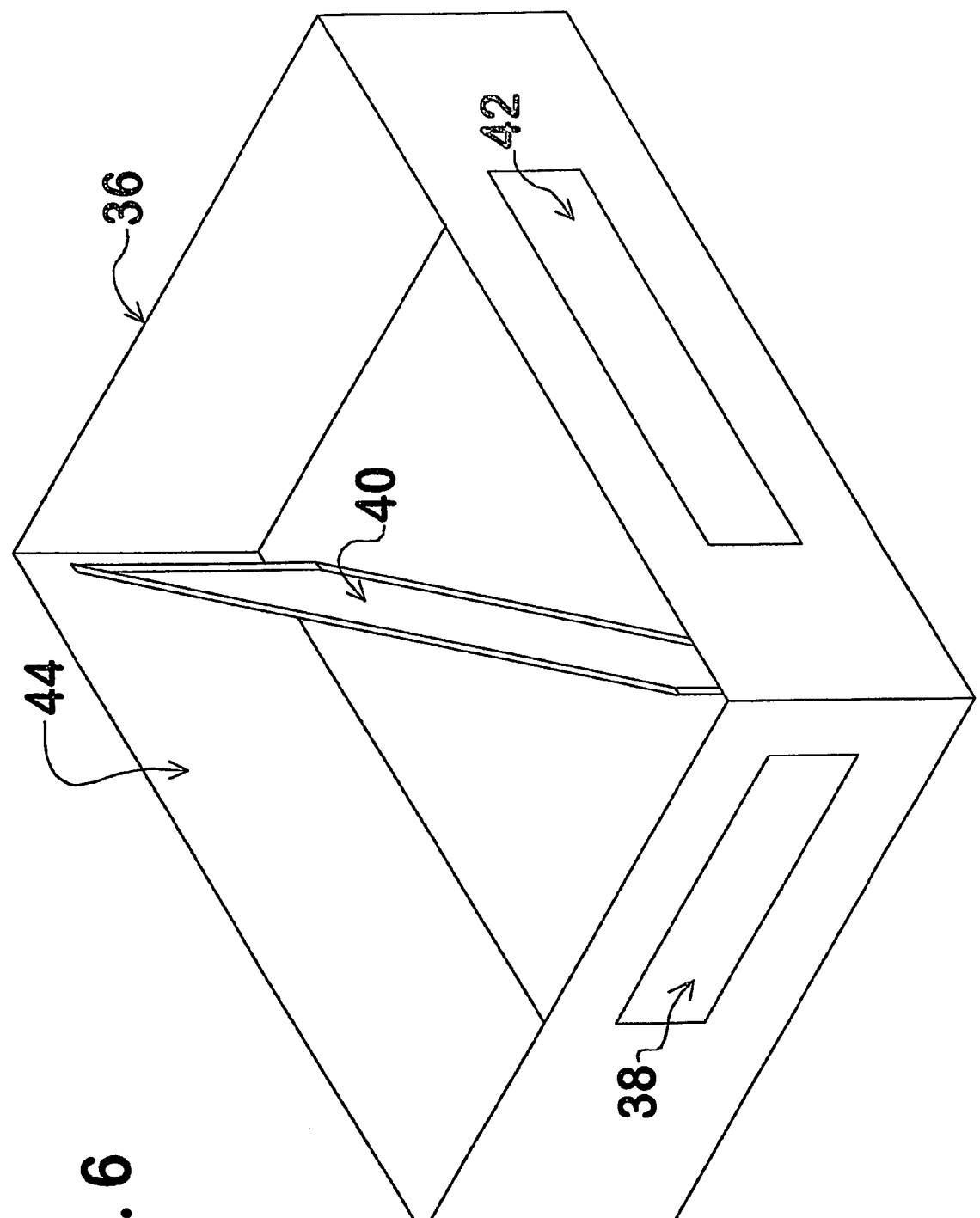
FIG. 6 illustrates a viewing device in accordance with the present invention.

Viewing of the recorded left and right images when they have been recorded on print film or video tape or a live feed from a video camera necessitates the use of a further viewing device. A part of the necessary further viewing device is shown in FIG. 6. The viewing device essentially comprises a box 36 that has two apertures formed in adjacent two sides of the box 36. A first aperture 38 is used to introduce light rays from the recorded left and right eye images as will be described in more detail below. Located within the box at an angle to each of the sides is a two-way mirror 40. The two-way mirror is located so as to divide the box into two halves, with the first aperture 38 being located in one half and a second aperture 42 in the other half. In use, the light rays from the left and right eye images are directed through the first aperture 38 so that they are incident upon the reflective side of the two-way mirror 40. The mirror 40 is angled such that the left and right images are redirected onto a front-projection screen attached to the inside surface of the rear wall 44 of the box 36.

Figure 7:
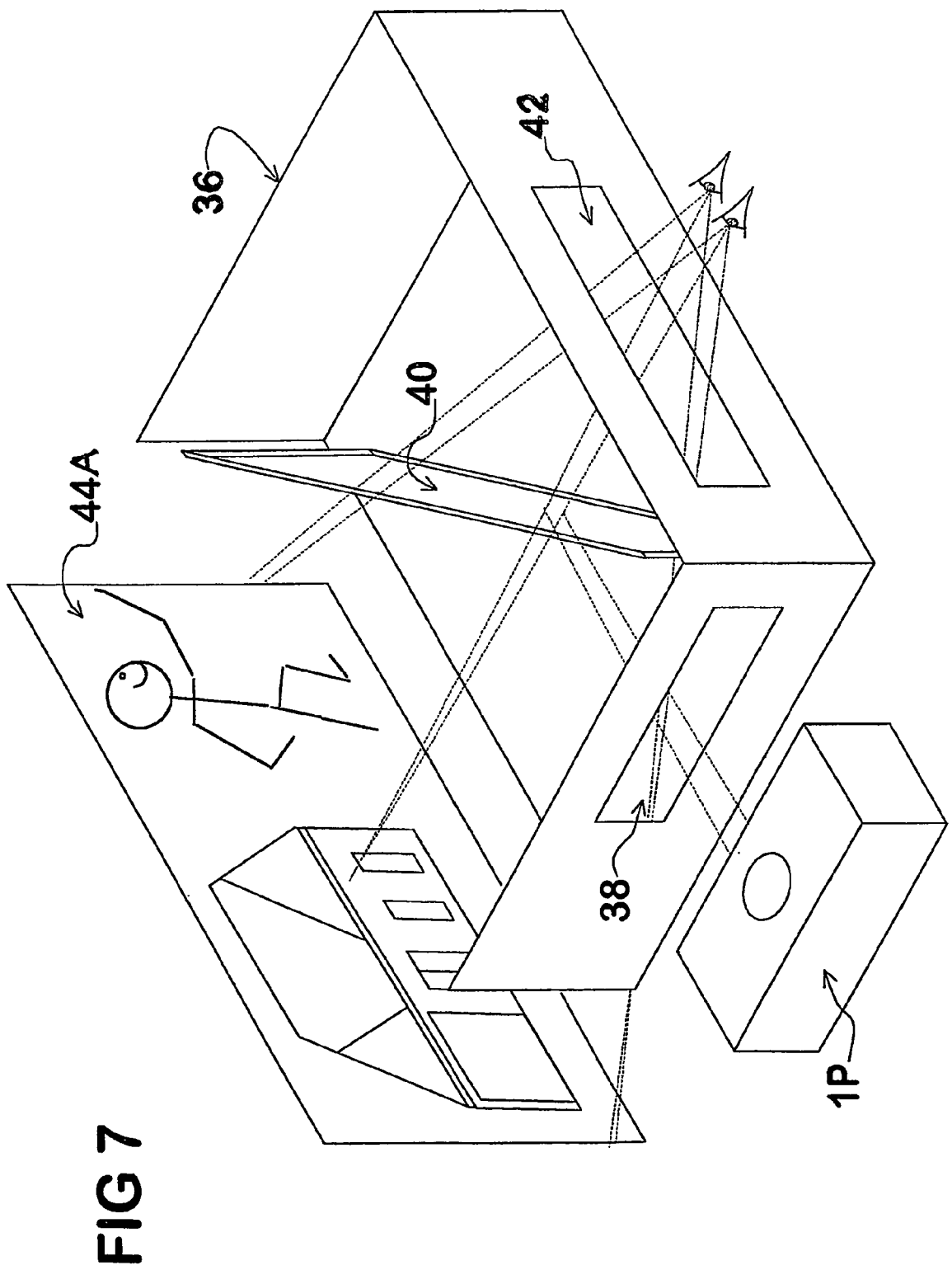
FIG. 7 schematically illustrates the light paths within the viewing device shown in FIG. 6.

As shown in FIG. 7, the projected image is viewed by an observer through the second aperture 42, looking through the two-way mirror 40. With the box wall 44 removed, a front-projection screen 44A can be placed at some distance away from the two-way mirror 40.

The front projection screen 44A is covered by a material that is auto-collimating. It comprises a plurality of tiny spheres that have the optical property that they redirect light that is incident on them back along the axis of the light ray. The effect of this property is that the left and right eye images projected onto the rear wall 44 or on the screen 44A by the two-way mirror 40 are reflected in a highly directional manner to an observer looking through aperture 42. This means that, if the observer is positioned correctly in front of the aperture 42, the left eye image will only be seen by the left eye of the observer and, equally, the right eye image will only be seen by the right eye of the observer. This therefore allows the observer to see the three-dimensional image without the use of polarizing filters, i.e. with the naked eyes.

Figure 8:
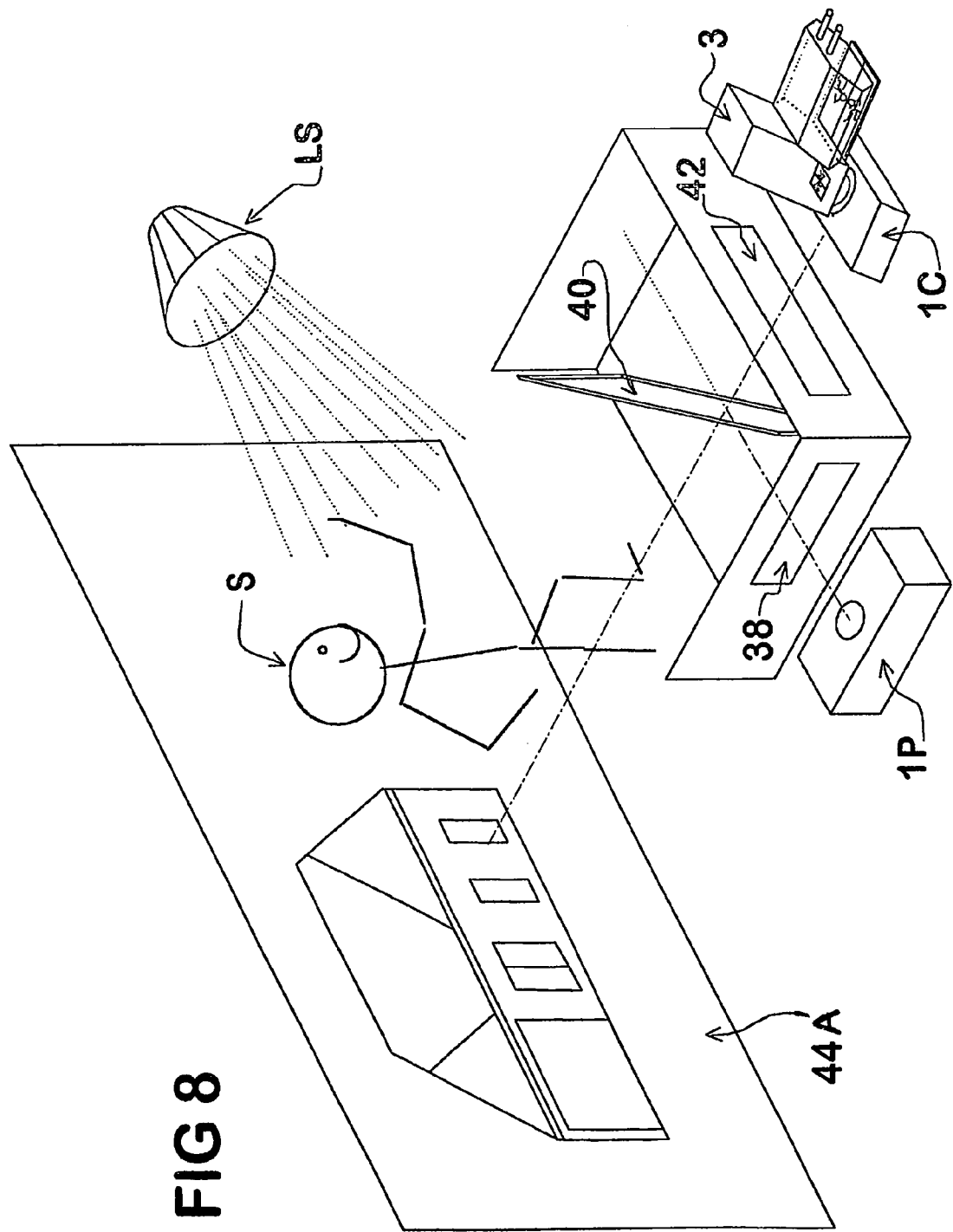
FIG. 8 is a further view of the viewing device shown in FIG. 6 together with the apparatus shown in FIG. 1 with a video camera attached.

FIG. 8 shows a camera with a stereoscopic apparatus 1C attached to the camera lens placed in the position of the viewer and aligned correctly along the corresponding axis of the stereoscopic projection apparatus 1P so that it can record both left and right stereoscopic images simultaneously. Moreover, a subject S placed in front of the front-projection screen within the field of view of the apparatus 1C and lit appropriately by light source LS will be recorded as a three-dimensional composite image with the background.

FIG. 9A illustrates a second viewing device VD attached to the flip-out screen 45 of a video camera 3 displaying a stereoscopic pair of images 20 and 22. The video camera lens 7 is attached to the stereoscopic apparatus 1 by means of a ring 5 resulting in a pair of stereoscopic images at focal plane 16. The viewer can see a three-dimensional image through eyepieces 46' and 46". The direction of view is indicated by an arrow pointing towards the subject S. The stereoscopic scene can be viewed during recording and playback.

The viewing device may also be used remotely or independently of the video camera in conjunction with a flat screen TV or computer monitor.

Figure 9B:
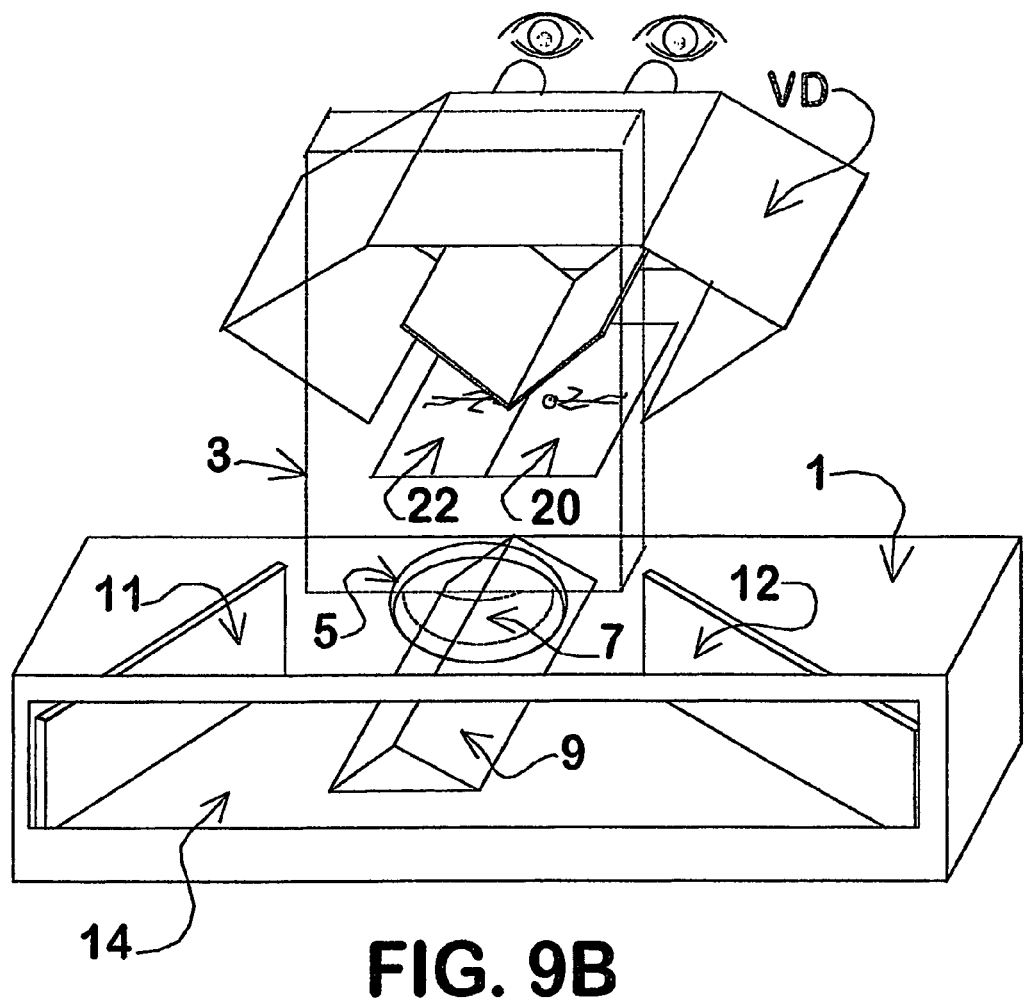
FIG. 9B schematically illustrates the optical layout and location of a viewing device relative to the flip-out screen of the video camera and the optical layout of the apparatus shown in FIG. 1.

FIG. 9B is a further illustration of the video viewer shown in FIG. 9A.

Figure 9C:
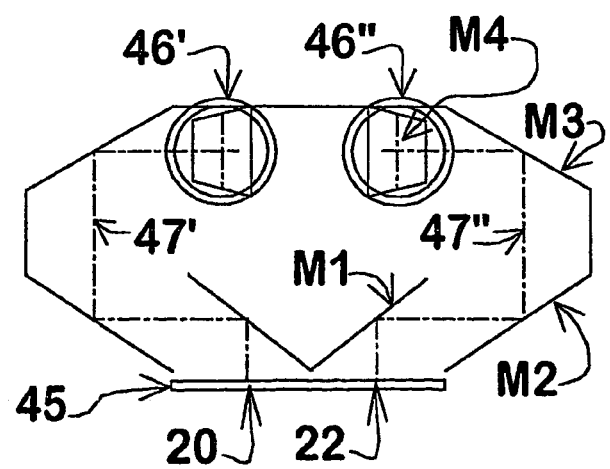
FIG. 9C schematically illustrates the location and the optical path of the viewing device relative to a flat screen monitor.

FIG. 9C illustrates the light paths 47' and 47" from the center of the left and right stereoscopic images 20 and 22 displayed on a flat screen monitor 45 via reflecting surfaces M1, M2, M3 and M4 to the eyepieces 46' and 46".

The invention claimed is:

1. A stereoscopic attachment for a camera or projector for providing left and right eye images with a horizontal axis of view of approximately 45° along the axis of a single camera lens, the apparatus comprising:

optical means arranged to provide said left and right images as a pair of head-to-head or toe-to-toe images such that the left and right eye images are simultaneously recorded as a composite image onto a single frame of a recording medium;

said optical means including two reflecting elements for each of the two images respectively with the reflecting elements being positioned in front of a camera lens;

said reflecting elements including first and second reflecting elements arranged to receive the left and right eye images respectively and further including third and fourth reflecting elements arranged to receive said left and right eye images from said first and second reflecting elements to provide said left and right eye images along the axis of a camera lens whose axis is set at 90° to the direction of view of said first and second reflecting elements;

said first and second reflecting elements comprising first and second plane mirrors and said third and fourth reflecting elements comprising two smaller plane mirrors positioned adjacent to each other;

said first and second plane mirrors each being arranged to reflect the light rays of the left and right eye images respectively onto the smaller plane mirrors which are arranged to reflect the incident light rays towards said camera lens;

an optical element arranged to extend the horizontal angle of view of the apparatus, the optical element comprising a pair of optically identical first lenses or lens groups of negative optical power, each first lens or lens group being located along the respective axes of the left and right eye images and in front of the said first and second reflecting elements;

the optical element also comprising a second lens or lens group of positive power located along the axis between the camera lens and the third and fourth reflecting elements such that both the left and right eye images are incident on the second lens or lens group;

both parts of the optical element being coupled to a convergence adjustment means so that operation of said convergence adjustment means causes adjustment of the two parts of said optical element; and a viewing device comprising a viewing box into which said composite image is projected, the viewing box having a wall and one or more reflective surfaces that are arranged to project the left and right eye images onto said wall, the viewing box further comprising a viewing window through which said projected composite image may be viewed.

* * * * *